United States Patent
Michiels (10) Patent No.: US 9,584,310 B2
(45) Date of Patent: Feb. 28, 2017

(54) PROTECTING A WHITE-BOX IMPLEMENTATION AGAINST ATTACKS

(71) Applicant: NXP B.V., Eindhoven (NL)

(72) Inventor: Wil Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 51 days.

(21) Appl. No.: 14/219,606

(22) Filed: Mar. 19, 2014

(65) Prior Publication Data

US 2015/0270949 A1    Sep. 24, 2015

(51) Int. Cl.
| | | |
|---|---|---|
| H04L 29/06 | (2006.01) | |
| H04L 9/00 | (2006.01) | |
| G09C 1/00 | (2006.01) | |
| H04L 9/14 | (2006.01) | |
| H04L 9/06 | (2006.01) | |

(52) U.S. Cl.
CPC ............ H04L 9/002 (2013.01); G09C 1/00 (2013.01); H04L 9/14 (2013.01); H04L 63/1466 (2013.01); H04L 9/0618 (2013.01); H04L 2209/046 (2013.01); H04L 2209/16 (2013.01); H04L 2209/24 (2013.01)

(58) Field of Classification Search
CPC .................... H04L 2209/24; H04L 9/0625
USPC .......................................................... 380/28
See application file for complete search history.

(56) References Cited

U.S. PATENT DOCUMENTS

| | | | | |
|---|---|---|---|---|
| 6,314,186 | B1* | 11/2001 | Lee | H04L 9/002 380/28 |
| 2002/0034295 | A1* | 3/2002 | Den Boer | H04L 9/002 380/37 |
| 2007/0014394 | A1 | 1/2007 | Harder et al. | |
| 2009/0262925 | A1* | 10/2009 | Vijayarangan | H04L 9/0637 380/29 |
| 2010/0125728 | A1* | 5/2010 | Gueron | H04L 9/0631 713/150 |
| 2012/0002807 | A1 | 1/2012 | Michiels | |
| 2013/0259226 | A1 | 10/2013 | Ciet et al. | |

FOREIGN PATENT DOCUMENTS

| | | |
|---|---|---|
| WO | 2010/102960 A1 | 9/2010 |
| WO | WO2010/102960 * | 9/2010 |

OTHER PUBLICATIONS

"Syncrosoft MCFACT—Secure Data Processing Technology", Re-trust Sixth Quarterly Meeting, Mar. 11, 2008, Villach, Austria, 108 pages.

(Continued)

*Primary Examiner* — Jason K Gee (57) ABSTRACT

A method of performing a keyed cryptographic operation mapping an input message to an output message, wherein the cryptographic operation includes at least one round including a non-linear mapping function configured to map input data to output data, including: splitting the input data into n split input data, wherein the splitting of the input data varies based upon the value of the input message; inputting each split input data into the non-linear mapping function to obtain n split output data, wherein a combination the n split output data indicates an output data, wherein the output data results when the input data is input to the non-linear mapping function.

9 Claims, 4 Drawing Sheets

(56) References Cited

OTHER PUBLICATIONS

Billet, Olivier et al., "Cryptanalysis of a White Box AES Implementation", Selected Areas in Cryptography, vol. 3357 of Lecture Notes in Computer Science,, Springer, 2005, 227-240.
Chow, Stanley et al., "A White-Box DES Implementation for DRM Applications", Digital Rights Management: ACM CCS-9 Workshop, DRM 2002, Washington, D.C., USA, Nov. 18, 2002, 1-16.
Chow, Stanley et al., "White-Box Cryptography and an AES Implementation", Cryptography: 9th Annual International Workshop, SAC 2002, St. John's, Newfoundland, Canada, Aug. 15, 2002.
EP COMM and EP Search Reportfor EP 15 15 7448 dated Aug. 20, 2015.
Biryukov, et al., "A Toolbox for Cryptanalysis: Linear and Affine Equivalence Algorithms", Advances Cryptology-EUROCRYPT 2003, Lecture Notes in Computer Science 2656 E. Biham (ed.), 33-50.
Herbst, An AES Smart Card Implementation Resistant to Power Analysis Attacks, Applied Cryptography and Network Security Lecture Notes in Computer Science; Jan. 1, 2006, pp. 239-252.

\* cited by examiner

FIG. 1

WHITE-BOX IMPLEMENTATION

FUNCTIONS $f_i$, $g_i$, FIXED

PROTECTING A WHITE-BOX IMPLEMENTATION AGAINST ATTACKS

TECHNICAL FIELD

Various exemplary embodiments disclosed herein relate generally to securing software components that perform a cryptographic function against attacks.

BACKGROUND

The Internet provides users with convenient and ubiquitous access to digital content. Because the Internet is a powerful distribution channel, many user devices strive to directly access the Internet. The user devices may include a personal computer, laptop computer, set-top box, Internet enabled media player, mobile telephone, smart phone, tablet, mobile hotspot, or any other device that is capable of accessing the Internet. The use of the Internet as a distribution medium for copyrighted content creates the compelling challenge to secure the interests of the content provider. Increasingly, user devices operate using a processor loaded with suitable software to render (playback) digital content, such as audio and/or video. Control of the playback software is one way to enforce the interests of the content owner including the terms and conditions under which the content may be used. Previously many user devices were closed systems. Today more and more platforms are partially open. Some users may be assumed to have complete control over and access to the hardware and software that provides access to the content and a large amount of time and resources to attack and bypass any content protection mechanisms. As a consequence, content providers must deliver content to legitimate users across a hostile network to a community where not all users or user devices can be trusted.

Secure software applications may be called upon to carry out various functions such as, for example, cryptographic functions used to protect and authenticate digital content. In order to counter attacks, these algorithms have to be obfuscated (hidden) in order to prevent reverse engineering and modification of the algorithm or prohibit obtaining the user-specific secure information. Accordingly, the functions of the secure software application may be carried out by various functions as defined by the instruction set of the processor implementing the secure software. For example, one way to obscure these functions is by the use of lookup tables.

Content providers must deliver content to legitimate users across a hostile network to a community where not all users or devices can be trusted. This has lead to the development of white-box cryptography. In the white-box cryptography scenario it is assumed that the user has complete control of the hardware and software that provides access to the content, and an unlimited amount of time and resources to attack and bypass any content protection mechanisms. The secure software code that enforces the terms and conditions under which the content may be used should be tamper resistant. Digital rights management is a common application of secure software applications. The general approach in digital rights management for protected content distributed to user devices is to encrypt the digital content using for example, DES (Data Encryption Standard), AES (Advanced Encryption Standard), or using other known encryption schemes, and to use decryption keys to recover the digital content. These decryption keys must be protected to prevent unauthorized access to protected material.

Two main areas of vulnerability of digital rights management relying on encryption include the software modules which enforce the terms and conditions under which the content may be used, and the key distribution and handling. Typically, the software module enforces the terms and conditions under which the content is to be used. An attacker aiming to bypass these terms and conditions may attempt to achieve this through tampering of the program code of the software module.

Regarding key distribution, a media player has to retrieve a decryption key from a license database in order to play back the media. The media player then has to store this decryption key somewhere in memory for the decryption of the encrypted content. This leaves an attacker two options for an attack on the key. First, an attacker may reverse engineer the license database access function allowing the attacker to retrieve asset keys from all license databases. In this situation the attacker does not need to understand the internal working of the cryptographic function. Second, the attacker may observe accesses of the memory during content decryption, thus the attacker may retrieve the decryption key. In both cases the key is considered to be compromised.

The widespread use of DRM and other secure software has given rise to the need for secure, tamper-resistant software that seeks to complicate tampering with the software. Various techniques for increasing the tamper resistance of software applications exist. Most of these techniques are based on hiding the embedded knowledge of the application by adding a veil of randomness and complexity in both the control and the data path of the software application. The idea behind this is that it becomes more difficult to extract information merely by code inspection. It is therefore more difficult to find the code that, for example, handles access and permission control of the secure application, and consequently to change it.

As used herein, white-box cryptography includes a secure software application that performs cryptographic functions in an environment where an attacker has complete control of the system running the white-box cryptography software. Thus, the attacker can modify inputs and outputs, track the operations of the software, sample and monitor memory used by the software at any time, and even modify the software. Accordingly, the secure functions need to be carried out in a manner that prevents the disclosure of secret information used in the secure functionality. White-box cryptography functions may be implemented in various ways. Such methods include: obscuring the software code; using complex mathematical functions that obscure the use of the secret information; using look-up tables; using finite state machines; or any other methods that carry out cryptographic functions but hide the secret information needed for those secure functions. A white-box implementation may also contain components that include anti-debugging and tamper-proofing properties.

There are several reasons for preferring a software implementation of a cryptographic algorithm to a hardware implementation. This may, for instance, be the case because a software solution is renewable if the keys leak out, because it is has lower cost, or because the application-developer has no influence on the hardware where the white-box system is implemented.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various exemplary embodiments relate to a method of performing a keyed cryptographic operation mapping an input message to an output message, wherein the cryptographic operation includes at least one round including a non-linear mapping function configured to map input data to output data, including: splitting the input data into n split input data, wherein the splitting of the input data varies based upon the value of the input message; inputting each split input data into the non-linear mapping function to obtain n split output data, wherein a combination the n split output data indicates an output data, wherein the output data results when the input data is input to the non-linear mapping function.

Various embodiments are described wherein inputting each split input data into the non-linear mapping function includes inputting each split input data into a plurality of split mapping functions wherein XORing the plurality of split mapping functions results in the non-linear mapping function.

Various embodiments are described wherein the steps of splitting and inputting are associated with a current round of the keyed cryptographic operation producing an output of the current round that is the input to a next round of the keyed cryptographic operation and wherein the keyed cryptographic operation repeats the steps of splitting and inputting on the input to the next round of the keyed cryptographic operation.

Various embodiments are described wherein in the next round the value of m is greater than the value of n in the current round and wherein the next round is the second to last round of the keyed cryptographic operation.

Various embodiments are described wherein in the current round the value of n is greater than the value of m in the next round and wherein the current round is the second round of the keyed cryptographic operation.

Various embodiments are described wherein the splitting of the input data in to n split input data is part of a previous round where the outputs of the previous round become the input to a current round.

Various embodiments are described wherein the splitting of the input data depends on a plurality of different portions of the input data.

Various embodiments are described wherein lookup tables implement the keyed cryptographic operation.

Various embodiments are described wherein finite state machines implement keyed cryptographic operation.

Various embodiments are described wherein inputting each split input data into the non-linear mapping function further includes inputting $f^{-1} \circ \alpha_i \circ f(x)$ wherein the function f carries out a key addition function on input data x and $\alpha_i$ is the $i^{th}$ split input data.

Further, various exemplary embodiments relate to a method of performing a keyed cryptographic operation mapping an input message to an output message, wherein the cryptographic operation includes at least one round including a non-linear mapping function configured to map input data to output data, including: selecting n pairs of mappings based upon the input data, wherein the n pairs of mappings include a first mapping and a second mapping, wherein the first and second mappings are a set of self-equivalences of the non-linear function, and wherein a combination of the second mappings of the output of the non-linear function results in a known function of the output of the non-linear function when the input data is input to the non-linear function; splitting the input data into n split input data by calculating the first mapping of the input data for each of the n first input mappings; inputting each of the n split input data into the non-linear mapping function to obtain n split output data.

Various embodiments are described wherein inputting each of the n split input data into the non-linear mapping function includes inputting each of the n split input data into a plurality of split mapping functions wherein XORing the plurality of split mapping functions results in the non-linear mapping function.

Various embodiments are described wherein the steps of selecting, splitting, and inputting are associated with a current round of the keyed cryptographic operation producing an output of the current round that is the input to a next round of the keyed cryptographic operation and wherein the keyed cryptographic operation repeats the steps of selecting, splitting, and inputting on the input to the next round of the keyed cryptographic operation.

Various embodiments are described wherein in the next round the value of m is greater than the value of n in the current round and wherein the next round is the second to last round of the keyed cryptographic operation.

Various embodiments are described wherein in the current round the value of n is greater than the value of m in the next round and wherein the current round is the second round of the keyed cryptographic operation.

Various embodiments are described wherein the splitting the input data into n split input data is part of a previous round where the outputs of the previous round become the input to a current round.

Various embodiments are described wherein the n first mappings are affine.

Various embodiments are described wherein the n second mappings are affine.

Various embodiments are described wherein the splitting of the input data depends on one portion of the input data.

Various embodiments are described wherein the splitting of the input data depends on a plurality of different portions of the input data.

Various embodiments are described wherein lookup tables implement the keyed cryptographic operation.

Various embodiments are described wherein finite state machines implement keyed cryptographic operation.

Various embodiments are described wherein inputting each split input data into the non-linear mapping function further includes inputting $f^{-1} \circ \alpha_i \circ f(x)$ wherein the function f carries out a key addition function on input data x and $\alpha_i$ is the $i^{th}$ first mapping.

Various embodiments are described wherein the known function is based upon the input data.

Further, various exemplary embodiments relate to a method of performing a keyed cryptographic operation mapping an input message to an output message, where the cryptographic operation includes a non-linear mapping function configured to map input data to output data, including: calculating $\alpha_i(x)$ for each value of i less than or equal to n, wherein $\alpha_i(x)$ is defined as one of n pairs of mappings $(\alpha, \beta)$ based upon the input message, wherein the n pairs of mappings $(\alpha, \beta)$ are a set of self-equivalences of the non-linear function, wherein n>1, and wherein for $\forall_x \oplus_i \beta_i(y) = h(y)$ where h(y) is affine; inputting each $\alpha_i(x)$ into the non-linear mapping function to obtain $\beta_i(y)$, wherein y is the output data when x is the input data to the non-linear mapping function.

Various embodiments are described wherein inputting each $\alpha_i(x)$ into the non-linear mapping function includes inputting each $\alpha_i(x)$ into a plurality of split mapping functions wherein XORing the plurality of split mapping functions results in the non-linear mapping function and wherein the outputs of the plurality of mapping functions combine to obtain $\beta_i(y)$.

Various embodiments are described wherein the steps of calculating and inputting are associated with a current round of the keyed cryptographic operation producing an output of the current round that is the input to a next round of the keyed cryptographic operation and wherein the keyed cryptographic operation repeats the steps of calculating and inputting on the input to the next round of the keyed cryptographic operation.

Various embodiments are described wherein in the next round the value of m is greater than the value of n in the current round and wherein the next round is the second to last round of the keyed cryptographic operation.

Various embodiments are described wherein n the current round the value of n is greater than the value of m in the next round and wherein the current round is the second round of the keyed cryptographic operation.

Various embodiments are described wherein the calculating $\alpha_i(x)$ for each value of i is part of a previous round where the outputs of the previous round become the input to a current round.

Various embodiments are described wherein the n mappings $\alpha$ are affine.

Various embodiments are described wherein the n mappings $\beta$ are affine.

Various embodiments are described wherein lookup tables implement the keyed cryptographic operation.

Various embodiments are described wherein finite state machines implement keyed cryptographic operation.

Various embodiments are described wherein inputting each $\alpha_i(x)$ into the non-linear mapping function further includes inputting $f^{-1} \circ \alpha_i \circ f(x)$ wherein the function f carries out a key addition function.

Various embodiments are described wherein the function h is based upon the input message.

Further, various exemplary embodiments relate to a method of performing a white-box implementation of an Advanced Encryption Standard (AES) cryptographic operation mapping an input message to an output message, where the cryptographic operation includes a AES substitution function configured to map input data to output data, including: selecting n pairs of mappings $(\alpha, \beta)$ based upon the input data x, wherein the n pairs of mappings $(\alpha, \beta)$ are a set of self-equivalences of the AES substitution function, wherein n>1, and wherein for $\forall_x \oplus_i \beta_i(y) = h(y)$ where $h(y)$ is affine; calculating $\alpha_i(x) = c_i^{-1} x$ for each value of i; inputting each $\alpha_i(x)$ into the AES substitution function to obtain $\beta_i(y) = A_{AES}(c_i \cdot A_{AES}^{-1}(x))$, wherein y is the output data when x is the input data to the AES substitution function.

Various embodiments are described wherein inputting each $\alpha_i(x)$ into the non-linear mapping function includes inputting each $\alpha_i(x)$ into a plurality of split mapping functions wherein XORing the plurality of split mapping functions results in the non-linear mapping function and wherein the outputs of the plurality of mapping functions combine to obtain $\beta_i(y)$.

Various embodiments are described wherein the steps of selecting, calculating, and inputting are associated with a current round of the AES cryptographic operation producing an output of the current round that is the input to a next round of the AES cryptographic operation and wherein the AES cryptographic operation repeats the steps of selecting, calculating, and inputting on the input to the next round of the AES cryptographic operation.

Various embodiments are described wherein in the next round the value of m is greater than the value of n in the current round and wherein the next round is the second to last round of the AES cryptographic operation.

Various embodiments are described wherein in the current round the value of n is greater than the value of m in the next round and wherein the current round is the second round of the AES cryptographic operation.

Various embodiments are described wherein the calculating $\alpha_i(x)$ for each value of i is part of a previous round Various embodiments are described wherein the n mappings $\alpha$ are affine.

Various embodiments are described wherein the n mappings $\beta$ are affine.

Various embodiments are described wherein $\alpha_i(x)$ depends on a plurality of input bytes of the input x.

Various embodiments are described wherein selecting n pairs of affine mappings $(\alpha, \beta)$ based upon the input message x further include: selecting values for $c_i$ based upon the input x for values i=1, n−1, wherein $c_i$ is a byte; and selecting a value for $c_n$ based upon h(y) and the values of $c_i$ for values i=1, n−1.

Various embodiments are described wherein selecting n pairs of affine mappings $(\alpha, \beta)$ based upon the input message x further includes: selecting values for $c_i$ based upon the input x for values i=1, n, wherein $c_i$ is a byte; and determining h(y) based upon the values of $c_i$ for values i=1, n.

Various embodiments are described wherein lookup tables implement the white-box implementation of an Advanced Encryption Standard (AES) cipher cryptographic operation.

Various embodiments are described wherein finite state machines implement the white-box implementation of an Advanced Encryption Standard (AES) cipher cryptographic operation.

Various embodiments are described wherein inputting each $\alpha_i(x)$ into the AES substitution function further includes inputting $f^{-1} \circ \alpha_i \circ f(x)$ wherein the function f carries out a key addition function Various embodiments are described wherein the function h is based upon the input message.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

A table-based approach to a white-box implementation of the Advanced Encryption Standard (AES) and the Data Encryption Standard (DES) were proposed in the following papers: "White-Box Cryptography and an AES Implementation", by Stanley Chow, Philip Eisen, Harold Johnson, and Paul C. Van Oorschot, in Selected Areas in Cryptography: 9th Annual International Workshop, SAC 2002, St. John's, Newfoundland, Canada, Aug. 15-16, 2002, referred to hereinafter as "Chow 1"; and "A White-Box DES Implementation for DRM Applications", by Stanley Chow, Phil Eisen, Harold Johnson, and Paul C. van Oorschot, in Digital Rights Management: ACM CCS-9 Workshop, DRM 2002, Washington, D.C., USA, Nov. 18, 2002, referred to hereinafter as "Chow 2". Chow 1 and Chow 2 disclose methods of using a table-based approach to hide the cryptographic key by a combination of encoding its tables with random bijections, and extending the cryptographic boundary by pushing it out further into the containing application.

However, a weakness in the approach of Chow is pointed out in a paper by Olivier Billet, Henri Gilbert, and Charaf Ech-Chatbi, "Cryptanalysis of a White Box AES Implementation," in Helena Handschuh and M. Anwar Hasan, editors, Selected Areas in Cryptography, volume 3357 of Lecture Notes in Computer Science, pages 227-240, Springer, 2005, referred to hereinafter as "Billet". This weakness may be exploited by an attacker, and may in a worst case result in revealing the secret key hidden in the white-box implementation.

The key observation by Billet is that the individual input words of the respective rounds in a white box implementation according to Chow are in a particular relation to corresponding input words in an ordinary non-white-box implementation. This relation can be expressed without reference to other input values than the individual input value. Although this relation is key-dependent and unknown to the attacker, this feature provides enough structure to substantially simplify the breaking of the white-box, as further explained in Billet.

Accordingly, it would be advantageous to have an improved white-box cryptographic system for performing a cryptographic operation which maps an input-message to an output-message that would counter the attack identified in Billet.

One reason why the construction of Chow is vulnerable is the fixed relation that exists between individual input values of respective rounds in the white-box implementation and individual input values in the ordinary non-white-box implementation. In the embodiments of the invention described below the splitting of an input byte x into n bytes $\alpha_1(x)$, $\alpha_2(x), \ldots, \alpha_n(x)$ using a series of functions $\alpha_n$ is introduced. The functions $\alpha_n$ are selected so that when each of the n bytes pass through the S-box, the results may be combined to achieve the desired result of passing the original by x through the S-box. The specific $\alpha_n$ functions used to split the input bytes are based upon the input, so they vary as the input varies. This feature breaks the fixed relationship exploited by the Billet attack. The split inputs are no longer in a fixed relationship with some individual input value in the non-white box implementation of the cryptographic operation. This complication is enough to foil the attack laid out in Billet.

By replacing the fixed encoding of values with splitting of the values, reverse engineering of the cryptographic system becomes harder, as it is harder for the reverse engineer to compare the working of the cryptographic system according to the invention with the workings of a non-white-box version of the cryptographic operation.

As noted, for many cryptographic operations it is desired to have a white-box implementation. The invention may be applied, for example, to symmetric and asymmetric cryptographic operations. Also, the invention may be applied to block ciphers, stream ciphers, message authentication schemes, signature schemes, etc. Note that the invention may also be applied to hash functions. The latter is especially useful if the hash function is used as a building block which processes secret information, e.g., a secret key, secret data, etc. For example, the invention may be applied to a hash function used in a keyed-Hash Message Authentication Code (HMAC or KHMAC). Well known block ciphers include: Advanced Encryption Standard (AES), Secure And Fast Encryption Routine, (SAFER, and variants SAFER+ and SAFER++), Blowfish, Data Encryption Standard (DES), etc. A well known stream cipher is RC4. Moreover any block cipher can be used as stream cipher using an appropriate mode of operation, e.g., Cipher feedback (CFB), Counter mode (CTR), etc.

The input message can represent, e.g., encrypted content data, such as multi-media data, including audio and/or video data. The encrypted content data may also include encrypted software, e.g., encrypted computer code representing some computer application, e.g., a computer game, or an office application. The input message may also represent a key for use in a further cryptographic operation. The latter may be used, for example, in a key exchange protocol, wherein a white-box implementation according to the invention encrypts and/or decrypts data representing a new key. The input data may also be plain data, for example, plain user data. The latter is especially advantageous in message authentication schemes. A white-box implementation according to the invention may have the property that the implementation may only be used for encryption, only be used for decryption, but not for both. For example, this property can be achieved if the implementation uses look-up tables which are not bijective, for example, a look-up table having more input bits than output bits. Accordingly, if a user only has a white-box decryptor, he may verify a MAC code but not create new MACS. This strengthens the non-repudiation properties of such a message authentication scheme.

The secure software may be implemented using a plurality of basic blocks. The plurality of basic blocks is interconnected, in the sense that some of the blocks build on the outputs of one or more of the previous blocks. A basic block may be implemented in hardware, for example, as a computer chip. A basic block may use a switch board, a state machine or any other suitable construction for implementing functions in computer hardware. A basic block may also be implemented in software running on a general purpose computer chip, e.g. a microprocessor. For example, a basic block may use a plurality of computer instructions, including arithmetical instructions, which together implement the functionality of the basic block. A widely used implementation for the basic block, which may be used both in software and hardware, is a look-up table. For example, Chow 1 and Chow 2 take this approach to implement the AES and DES block ciphers. A look-up table implementation includes a list which lists for possible input values, an output value. The input value may be explicit in the lookup table. In that situation the look-up table implementation could map a particular input to a particular output by searching in the list of input values for the particular input. When the particular input is found the particular output is then also found. For example, the particular output may be stored alongside the particular input. Preferably, the input values are not stored explicitly, but only implicitly. For example, if the possible inputs are a consecutive range, e.g. of numbers or bit-strings, the look-up table may be restricted to storing a list of the output values. A particular input number may, e.g., be mapped to the particular output which is stored at a location indicated by the number.

For example, a look up table for a function may be created by computing the output value of the function for its possible inputs and storing the outputs in a list. If the function depends on multiple inputs the outputs may be computed and stored for all possible combinations of the multiple inputs. Look-up tables are especially suited to implement non-linear functions, which map inputs to output in irregular ways. A white-box implementation can be further obfuscated, as is explained below, by applying to one or more of its look-up tables a fixed obfuscating input encoding and a fixed output encodings. The results of applying a fixed obfuscating input encoding and output encodings is then fully pre-evaluated. Using this technique, a look-up table would be replaced by an obfuscated look-up table which has the same dimensions, that it takes the same number input bits and produces the same number of output bits. The input encoding and output encoding used in such obfuscation are not explicit in the final white-box implementation. A better obfuscation is achieved in the embodiments of the invention described below, which introduces splitting input bytes in a manner which is not fixed but rather depend on the input. It is noted that the input splitting described herein may be combined with traditional obfuscation techniques to advantage, as together they further obscure the inner workings of the cryptographic operation.

The network of basic blocks are arranged to compute an output message when they are presented with an input message. Typically, the input message is operated upon by a number of basic input blocks. A number of further basic blocks may take input from one or more of the basic input blocks and/or from the input. Yet further basic blocks can take input in any combination of the input message, the output of basic input blocks and the output of the further basic blocks. Finally some set of basic exit blocks, i.e., at least one, produce as output all or part of the output-message. In this manner a network of basic blocks emerges which collectively computes the mapping from the input message to output message.

The key used may be a cryptographic key and may contain sufficient entropy to withstand an anticipated brute force attack. It is noted that in a white-box implementation, the key is typically not explicitly present in the implementation. This would risk the key being found by inspection of the implementation. Typically, the key is only present implicitly. Various ways are known to hide a key in a cryptographic system. Typically, at least the method of partial evaluation is used, wherein a basic block which needs key input is evaluated in-so-far that it does not depend on the input-message. For example, a basic operation wherein an input-value, a masking value, which does not depend on the input-message, e.g. a value from an S-box, and a key-value need to be XORed can be partially evaluated by XORing the key value and the masking value together beforehand. In this way the operation still depends on the key-value although the key-value is not explicitly present in the implementation. Instead, only the XOR between the key-value and masking-value is present in the implementation. Note that, more complicated ways and/or further ways of hiding the keys are compatible with this invention.

Various splitting functions $\alpha_n$ may be used with the invention. A splitting function $\alpha_n$ provides a new way to represent a data value. Typically, the splitting function $\alpha_n$ is also bijective, although this is not necessary.

A set of self-equivalent splitting functions may be used to split the input. For example, if x is an input to an S-box and y is the output, then a pair of functions $\alpha$ and $\beta$ are self equivalent if an input $\alpha_n(x)$ to the S-box results in an output $\beta_n(y)$. Such functions provide benefit in splitting the input to the S-box, for if the $\beta$ functions are selected so that their combination results in the output value y or a known function of y, then when the equivalent $\alpha$ functions are used to split the input, it is easy to obtain the desired output from the S-box while breaking the fixed encoding exploited by the Billet attack.

Determining affine self-equivalent splitting functions may be done using any suitable manner. For example, as described in the paper "A Toolbox for Cryptanalysis: Linear and Affine Equivalence Algorithms," by A. Biryukov, C. De Canniere, A. Braeken, and B. Preneel, Proceedings of Eurocrypt, 2003, pp. 33-50, referred hereinafter as Biryukov. In Biryukov, methods are described for determining affine self-equivalent functions for various encryption methods.

Below exemplary embodiments are described using the AES (Advanced Encryption Standard) block cipher, because AES has become a widely used standard for block ciphers. AES is a block cipher with a block size of 128 bits or 16 bytes. The plaintext is divided in blocks of 16 bytes which form the initial state of the encryption algorithm, and the final state of the encryption algorithm is the cipher text. At any given point in the encryption algorithm these 16 bytes are the state of the encryption algorithm. To conceptually explain AES, the bytes of the state are organized as a matrix of 4×4 bytes. AES includes a number of rounds, which depends on the key size. Each round is includes similar processing steps operating on bytes, rows, or columns of the state matrix, each round using a different round key in these processing steps. In the discussion using AES as an example, it is noted that AES defines a round in a specific manner. In the embodiments below, a round is any grouping of steps that includes at least one non-linear mapping function, such as an S-box in AES. Accordingly, a round as described below includes one non-linear mapping function and any combination of other steps of the cryptographic function. Further, the boundary of the round may start with the non-linear mapping function, for example an S-box, or any other operation that may be merged with the non-linear mapping function, for example a key addition.

Figure 1:
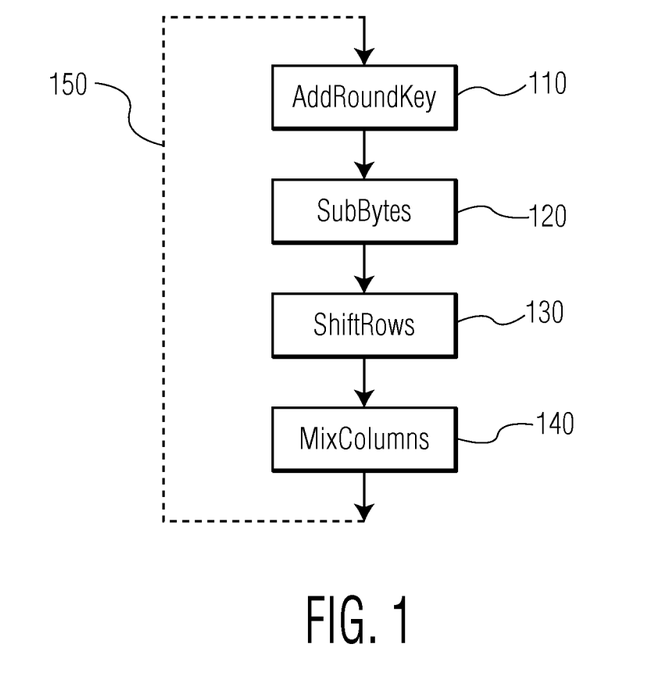
FIG. 1 illustrates the main steps of a round of AES.

FIG. 1 illustrates some main processing steps of a round of AES. The processing steps include:

AddRoundKey 110—each byte of the state is XORed with a byte of the round key;

SubBytes 120—a byte-to-byte permutation using a lookup table;

ShiftRows 140—each row of the state is rotated a fixed number of bytes; and

MixColumns 150—each column is processed using a modulo multiplication in GF(28).

The steps SubBytes 120, ShiftRows 130, and MixColumns 150 are independent of the particular key used. The key is applied in the step AddRoundKey 110. Except for the step ShiftRows 140, the processing steps can be performed on each column of the 4×4 state matrix without knowledge of the other columns. Therefore, they can be regarded as 32-bit operations as each column consists of four 8-bit values. Dashed line 150 indicates that the process is repeated until the required number of rounds has been performed.

Each of these steps or a combination of steps may be represented by a lookup table or by a network of lookup tables. If the AddRoundKey 110 step is implemented by XORing with the round key, then the key is visible to the attacker in the white-box attack context. The AddRoundKey 110 step can also be embedded in lookup tables, which makes it less obvious to find out the key. In fact, it is possible to replace a full round of AES by a network of lookup tables. For example, the SubBytes 120, ShiftRows 130, and MixColumns 150 steps may be implemented using table lookups. Below a possible white-box implementation of AES in sufficient detail is discussed to describe the embodiments of the invention below, but further detailed descriptions of such an implementation are found in Chow 1. Also, other variations in the lookup table implementation may be used which are within the scope of the invention.

Embodiments described below provide a different approach for implementing white-box implementations that do not have the weakness as described in Billet of having a fixed encoding on the S-box inputs. This fundamental weakness does not only apply to the table-based approach of Chow 1 and Chow 2, it also applies to finite state machine approaches and the approach of applying generic code transformation techniques to securely implement a cryptographic cipher. Also, for these approaches, the techniques of the embodiments of the invention described below may be used.

Figure 2:
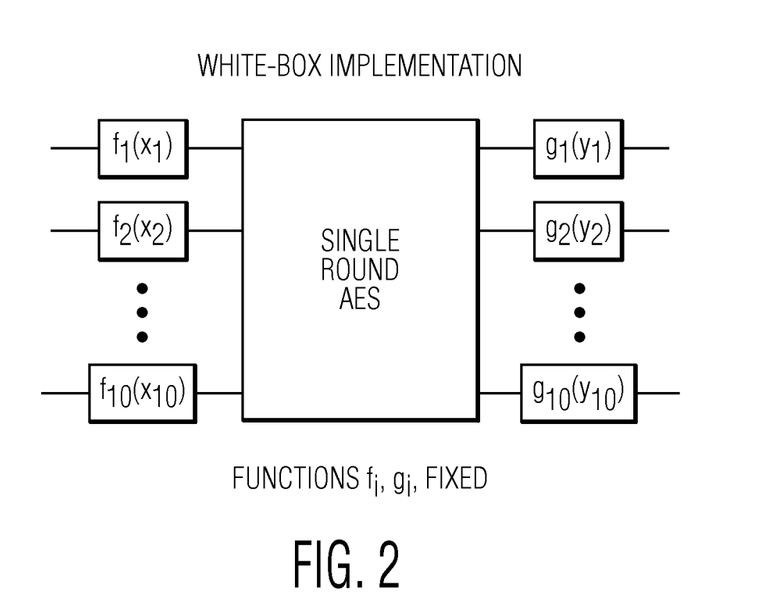
FIG. 2 illustrates a white-box AES implementation with fixed encodings on the input of the rounds.

Both the table-based white-box implementations and the finite state machine implementations have the property that all intermediate values in the implementation are encoded (as compared to a standard implementation). Examples of white-box implementations using finite state machines are disclosed in U.S. Patent Publication 2007/0014394 entitled "Data Processing Method" and a presentation at the Re-trust Sixth Quarterly Meeting entitled "Synchrosoft MCFACT™ Secure Data Processing Technology" by Wulf Harder and Ads Straujums dated Mar. 11, 2008, which each are hereby incorporated by reference for all purposes as if fully set forth herein. However, Billet shows that the implementation can be broken (i.e., the cryptographic key can be extracted) if the input to S-boxes is encoded by fixed encodings. FIG. 2 illustrates a white-box AES implementation with fixed encodings on the input of the rounds, i.e., on the input of the S-boxes. As shown, each of the 16 input bytes are encoded by $f_i$ and each of the output bytes are encoded by $g_i$.

As indicated, the white-box implementation illustrated in FIG. 2 may be broken due to the fixed encodings on the input (and output) bytes. This problem may be solved by splitting each input byte into n bytes, for some n>1. This split may be accomplished in a non-fixed way. Further, in some embodiments of the invention, in 2 independent runs of the white-box implementation, if the input byte $x_i$ to the round is the same, the input byte $x_i$ may be split into different n-byte-tuples. This implies that, for an attacker observing individual bytes in this tuple, the application of the splitting functions is not a fixed encoding of $x_i$. This protects against all known attacks.

Presented below is a more precise and formal description of the splitting of the input bytes.

First, let V be the set of affine self-equivalences of an S-box, i.e., $V=\{(\alpha,\beta)|S=\beta \circ S \circ \alpha^{-1}$ with $\alpha, \beta$ affine$\}$.

Next, let the set W contain n pairs from V as follows, where h is an affine bijective function:

$$W \subseteq \{\Gamma=(\Gamma_1,\Gamma_2,\ldots,\Gamma_n) \in V^n | \Gamma_i=(\alpha_i,\beta_i) \text{ with } \forall_x \oplus_i \beta_i(x)=h(x)\}.$$

The function h(x) may be a fixed affine function, such as the identity function, but can also be a by-the-computation-selected affine function. For example, in one embodiment described below, the function $\beta_i(x)=c_i x$ where $c_n=1 \oplus (\oplus_{i=1}^{n-1} c_i)$ and $c_i$ for i<n depends upon the input state. Alternatively, in another embodiment, $\oplus_{i=1}^n \beta_i(x)=h(x)$ for function h being given by the function $\beta$ (possibly up to a constant addition) with $(\alpha,\beta) \in V$ that is associated with multiplication coefficient $c=\oplus_{i=1}^n c_i$. This results in an example where h is dependent on a computation based upon the input state.

For an input byte x, n copies of the S-box are fed with the inputs $\alpha_1(x), \alpha_2(x), \ldots, \alpha_n$ for any $\Gamma \in W$. This results in the S-box outputs $\beta_1(y), \beta_2(y), \ldots, \beta_n(y)$. XORing the S-box outputs $\beta_1(y), \beta_2(y), \ldots, \beta_n(y)$ results in the correct S-box output y=S(x) up to an affine mapping h. Generally, the XOR is not calculated explicitly in order to minimize the opportunity to attack the white box implementation. This even holds for the values $\alpha_i(x)$ and $\beta_i(y)$, which are generally merged with other functions as the S-box is typically merged with other functions. This will be described in greater detail below with respect to the various embodiments.

The choice of $\Gamma \in W$ depends on a computation based upon the input bytes. Thus, it is not fixed, and as a result the Billet attack cannot be used to attack the white-box implementation.

Biryukov describes an algorithm to compute the set of affine self-equivalences of an S-box as described below.

In order to describe embodiments of the invention, a basic description of a table-based white-box AES implementation will be described. For a more detailed description of a method for implementing a table-based white-box AES see Chow 1. Chow 1 illustrates a specific implementation that breaks up certain functions using tables of specified sizes. It is well understood that various other divisions of the tables may be made resulting in different functions for the look-up tables and different sizes. Further, while the embodiments of the invention described below use a table-based white-box implementation of AES, other ciphers and cryptographic functions may be implemented according to the embodiments described. Also, other types of white-box implementations may be used instead of the table-base implementation, for example, a finite-state implementation.

The description of the table-based white-box AES is split into two steps. In the first step, a round of AES is described as a network of lookup tables. In the second step, the tables are obfuscated by encoding their input and output.

Step 1: Implementing AES as a Network of Lookup Tables.

AES operates on data blocks of 16 bytes. These are typically described as a 4×4 byte matrix, called the state including bytes $x_{1,1}, x_{1,2}, x_{1,3}, \ldots x_{4,4}$. A round of AES as described above with respect to FIG. 1 include the following operations: AddRoundKey 110, SubBytes 120, ShiftRows 130, and MixColumns 140. The first two operations, AddRoundKey and SubBytes can be merged into a single T-box operation. That is, we can define a byte-to-byte function $T_{i,j}$ for input byte $x_{i,j}$ as $T_{i,j}(x_{i,j})=S(x_{i,j}\oplus k_{i,j})$ where $k_{i,j}$ is a 16 byte round key based upon the AES key. Let $y_{i,j}$ be the output of $T_{i,j}$. The ShiftRows operations is just an index-renumbering of the output bytes $y_{i,j}$. For ease of presentation, this operation is omitted in this description, but may be incorporated into the look-up table implementing Ti,j or implemented as a separate manipulation of the state matrix. In the MixColumns step, an output byte $z_{l,j}$ of the round is computed from the 4 output bytes $y_{1,j}, y_{2,j}, y_{3,j},$ and $y_{4,j}$ via the algebraic expression $z_{l,j}=MC_{l,1}\cdot y_{1,j}\oplus MC_{l,2}\cdot y_{2,j}\oplus MC_{l,3}\cdot y_{3,j}\oplus MC_{l,4}\cdot y_{4,j}$ in $GF(2^8)$ for some constants $MC_{l,r}$.

Now define a lookup table for each byte-to-byte function $Q_{i,j,l}(x_{i,j})=MC_{l,i}\cdot T_{i,j}(x_{i,j})$ with i, j, l=1, 2, . . . , 16. Then any output byte may be computed by XORing the results of these lookup tables, i.e., $z_{l,j}=Q_{1,j,l}(x_{1,j})\oplus Q_{2,j,l}(x_{2,j})\oplus Q_{3,j,l}(x_{3,j})\oplus Q_{4,j,l}(x_{4,j})$. Note that the index i, j, l of Q-box can be interpreted as "the contribution of input byte i, j of a round to output byte l, j of the round". The XOR may be implemented to operate on each of two nibbles (i.e., 4-bit values) as a lookup table to reduce the size of the XOR tables. Accordingly, the Q-box may be implemented to produce output nibbles so that the size of the tables is reduced. Therefore, the computation of each output byte $z_{l,j}$ of an AES-round has been described as a network of lookup tables. The network of lookup tables to compute a single output nibble of byte $z_{2,3}$ is shown in FIG. 3.

Figure 3:
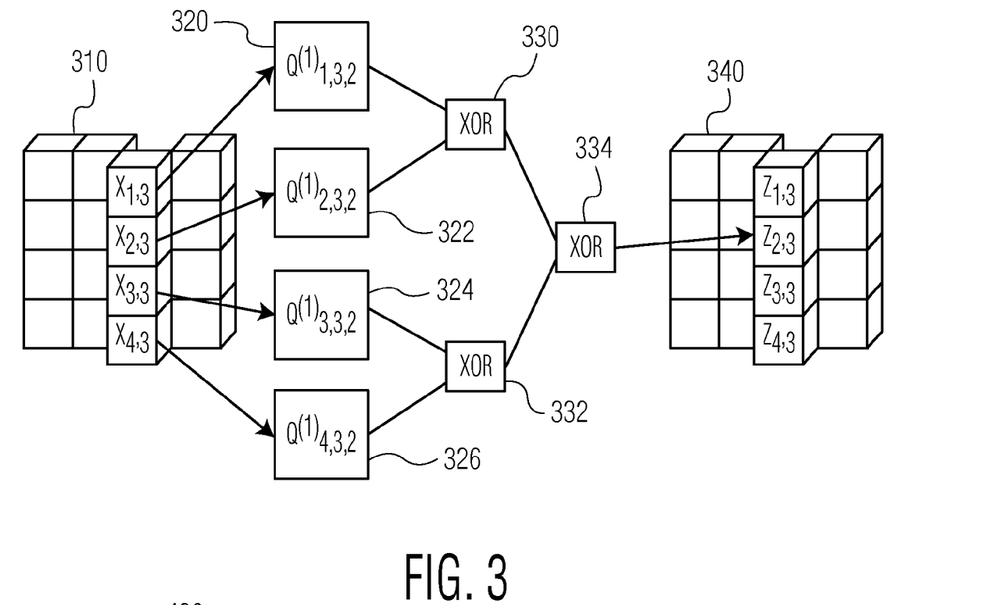
FIG. 3 illustrates the computation of one output nibble by means of a network of look-up tables.

FIG. 3 illustrates the computation of one output nibble by means of a network of look-up tables. The superscript index (1) in the Q-boxes indicates that the tables only provide the first nibble of the output of the Q-box. A set of input bytes $x_{1,3}, x_{2,3}, x_{3,3},$ and $x_{4,3}$ in the input state 310 are input into the Q-boxes 320, 322, 324, 326. The outputs of lookup tables 320 and 322 are fed into the XOR 330, and the outputs of lookup tables 324 and 326 are fed into the XOR 332. The outputs of XORs 330 and 332 are fed into XOR 334. The output of XOR 334 is the first nibble of the output $z_{2,3}$ of output state 340. The second nibble of the output $z_{2,3}$ of output state 340 may be calculated in the same way using additional Q-boxes along with a similar XOR network. Further, additional sets of tables may be implemented to completely convert the input state 310 into the output state 340 by receiving a column of bytes from the input state and converting them into the output of the corresponding column of the output state.

Step 2: Obfuscating the Tables and the Intermediate Values

Figure 4:
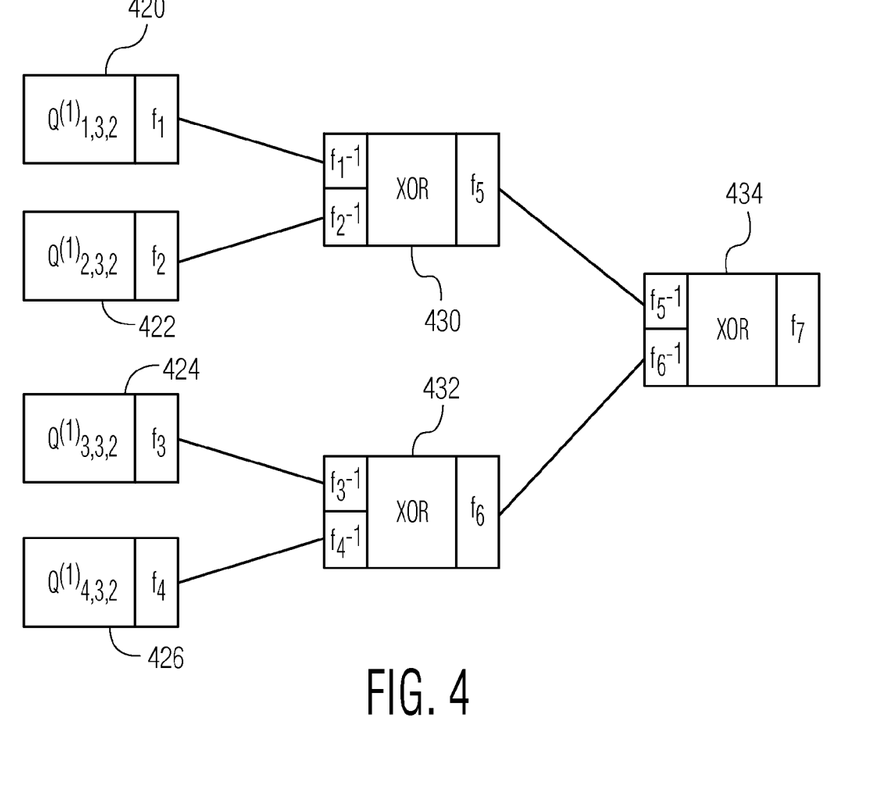
FIG. 4 illustrates a portion of the network table of FIG. 3 obfuscated by encoding the inputs and outputs.

In the implementation depicted in FIG. 3, the key may easily be extracted from the Q-boxes. Just applying the inverse MixColumns multiplication and the inverse S-box to the output reveals the plain AddRoundKey operation. To prevent this, the input and outputs of all lookup tables are encoded with arbitrary bijective functions. This is described in Chow 1. This means that a lookup table is merged with an encoding function that encodes the output and with a decoding function that decodes the input. The encodings are chosen such that the output encoding of one table matches the input encoding assumed in the next tables. A portion of the implementation of FIG. 3 is depicted in FIG. 4 for the first round. In this example, the input to the round is not encoded in order to be compliant with AES, but the output of the round is encoded. The output encoding is handled in the next round. That is, unlike the first round, the second round (and the later rounds) assumes that the input is encoded. Alternatively, the first round may receive an encoded input. This input encoding must then be applied elsewhere in the software program containing the white-box implementation. Similarly, the last round may or may not include an output encoding depending on whether the output is to be AES compliant. Note that in the white-box implementation obtained, both the lookup tables and the intermediate values are obfuscated.

FIG. 4 illustrates a portion of the network table of FIG. 3 obfuscated by encoding the inputs and outputs. The lookup tables 420, 422, 424, 426 correspond to lookup tables 320, 322, 324, 326 of FIG. 3. The outputs of look tables 420, 422, 424, 426 are encoded by functions $f_1, f_2, f_3, f_4$ respectively. XOR 430 corresponds to XOR 330. The inputs of XOR 430 decode input using $f_{1\text{-}1}$ and $f_{2\text{-}1}$. The output of XOR 430 is then encoded by function $f_5$. In a similar manner XORs 432, 434 have input decodings and output encodings as illustrated. The output $z_{2,3}$ is encoded using f. While the encodings on the inputs and outputs of the lookup tables provide some protection against simple attacks, an attacker may use the techniques described in Billet to attack this implementation of a white-box AES at the boundaries between the rounds of the AES implementation.

Embodiments are now described that prevent the attack as described by Billet. In the description of these embodiments a non-obfuscated table network is described in order to facilitate the description without added complexity. The embodiments described may be turned into an obfuscated table network in the same way as described in FIG. 4. Furthermore, the description focuses on how to implement the first round to provide the split input of the second round. One of skill in the art may obtain the complete white-box implementation by extending these ideas to all rounds.

The embodiments described below include the following aspects as previously described above. Let V be the set of affine self-equivalences of an S-box, i.e., $V=\{(\alpha,\beta)|S=\beta\circ S\circ\alpha^{-1}$ with $\alpha, \beta$ affine$\}$.

Next, let the set W contain n pairs from V as follows, where h is an affine bijective function:

$$W \subseteq \{\Gamma=(\Gamma_1,\Gamma_2,\ldots,\Gamma_n)\in V^n | \Gamma_i=(\alpha_i,\beta_i) \text{ with } \forall_x \oplus_i \beta_i(x)=h(x)\}.$$

The function h(x) may be a fixed affine function, such as the identity function, but can also be a by-the-computation-selected affine function.

For an input byte x, n copies of the S-box are fed with the inputs $\alpha_1(x), \alpha_2(x), \ldots, \alpha_n(x)$ for any $\Gamma\in W$. This results in the S-box outputs $\beta_1(y), \beta_2(y), \ldots, \beta_n$. XORing the S-box outputs $\beta_1(y), \beta_2(y), \ldots, \beta_n(y)$ results in the correct S-box output $y=S(x)$ up to an affine mapping h. Generally, the final XOR to obtain y is not calculated explicitly in order to minimize the opportunity to attack the white box implementation. This even holds for the values $\alpha_i(x)$ and $\beta_i(y)$, which are generally merged with other functions as the S-box is typically merged with other functions.

The choice of $\Gamma\in W$ depends on a computation based upon the input bytes as further described below. It is not fixed, and as a result the Billet attack cannot be used.

So, first the set V of affine self-equivalences of the AES S-box is defined. The AES S-box can be written as:

$$S(x)=A_{AES}(x^{-1}),$$

where the inverse is taken in $GF(2^8)$ and $A_{AES}$ is a fixed affine mapping. As shown by Biryukov, the set of self-equivalences is given by $$V = \left\{ \sqrt[2^l]{c^{-1} \cdot x}, A_{AES}\left(\sqrt[2^l]{c \cdot A_{AES}^{-1}(x)}\right) \middle| 0 \le l < 8 \wedge c \in GF(2^8) \backslash \{0\} \right\}.$$

We note that for any $(\alpha, \beta) \in V$ the function a is linear.

Further, the function h for the constant addition of $A_{AES}$ may be used, i.e., $h(x)=x \oplus C_{AES}$ with $A_{AES}=L_{AES}(x) \oplus C_{AES}$ for a linear mapping $L_{AES}$. Now let n=4 and define the set W as $$W = \{ \Gamma \in V^n | \Gamma_i = (\alpha_i, \beta_i) \text{ with } \beta_i : x \mapsto A_{AES}(c_i \cdot A_{AES}^{-1}(x)) \wedge c_n = 1 \oplus (\oplus_{j=1}^{n-1} c_j) \}.$$

This formulation complies with the more abstract definition of W. That is, for any $\Gamma=(\alpha_1,\beta_1), (\alpha_2,\beta_2), \ldots, (\alpha_n,\beta_n) \in W$ and any byte x, then $\oplus_i \beta_i(x) = h(x)$ as can be verified as follows:

$$\bigoplus_{i=1}^{4}(A_{AES}(c_i \cdot A_{AES}^{-1}(x))) = \{A_{AES} \text{ affine, constant canceled out}\}$$

$$L_{AES}\left(\bigoplus_{i=1}^{4}(c_i \cdot A_{AES}^{-1}(x))\right) = \{\text{distributive law}\}$$

$$L_{AES}\left(\left(\bigoplus_{i=1}^{4} c_i\right) \cdot A_{AES}^{-1}(x)\right) = \left\{c_4 = 1 \oplus \left(\bigoplus_{j=1}^{3} c_j\right)\right\}$$

$$L_{AES}(A_{AES}^{-1}(x)) = h(x)$$

The computation of output byte $z_{2,3}$ of first round of AES is now shown according to an exemplary embodiment of the invention for n=4 and $h(x)=x \oplus C_{AES}$ being the identity function. Alternatively, other values of n and h(x) may be chosen. The computation of other bytes runs similarly. This specifies the white-box implementation of the first round without the obfuscation step. The input to the first round is the input state x to be encrypted or decrypted. Nibbles of x are input to the Q-boxes to produce nibbles of the y values. The various y values output by the Q-boxes may then be combined into output bytes z that are part of the output state for the round. The y values may be used to select the input splitting functions α that will be applied to the output bytes of z because the output bytes z of the first round become the input bytes of the second round. As described below, these splitting functions may be incorporated while calculating the final values of the bytes z. Then in the second round, the output will be split using another set of splitting functions α selected in a similar manner as in the first round to produce the split input to the third round. This continues until the next to last round. This splitting of the input by the set of splitting functions α protects the interface between rounds of the AES process from the Billet attack.

Further, to ease the presentation, the key-addition of the second round is ignored for the time being. This means that the input of an AES S-box of the second round is given by an output byte of the first round. Later on, it will be described how to cope with the key-addition.

The choice of F E W depends on a computation based upon the input bytes, and because it is not fixed, the Billet attack cannot be used against $z_{2,3}$. Because n=4, the first round now has to compute the n=4-tuple of bytes $\alpha_{2,3,1}(z_{2,3})$, $\alpha_{2,3,2}(z_{2,3})$, $\alpha_{2,3,3}(z_{2,3})$, $\alpha_{2,3,4}(z_{2,3})$ (where the output byte $z_{2,3}$ is used as an example), where the affine functions $\alpha_{2,3,k}$ are taken from W and are not fixed, i.e., can be different for different runs of the white-box implementation. These bytes $\alpha_{2,3,1}(z_{2,3}))$, $\alpha_{2,3,2}(z_{2,3})$, $\alpha_{2,3,3}(z_{2,3})$, $\alpha_{2,3,4}(z_{2,3})$ become the input to the second round. Being an element from W, means that $\alpha_{2,3,k}$: $x \mapsto c_k^{-1} \cdot x$ for some $c_k \in GF(2^8) \backslash \{0\}$ with $c_4 = 1 \oplus c_1 \oplus c_2 \oplus c_3$ because $h(x)=x \oplus C_{AES}$ in this exemplary embodiment.

There are 4 input bytes to the first round contributing to the value of $z_{2,3}$. On these four input bytes, first a Q-box operation is performed as shown in FIG. 3. Let $y_{i,3,2}$ be the ith output byte of these four Q-box operations. Now let $c_i$ be obtained from the first nibble of $y_{i,3,2}$ via $c_i = (y_{1,2,3}^{(1)}, 1, 0, 0, 0) \in GF(2^8) \backslash \{0\}$, for i≠4. For i=4, let $c_4 = 1 \oplus c_1 \oplus c_2 \oplus c_3$. Hence $c_4 = 1 \oplus (y_{1,2,3}^{(1)} \oplus y_{2,2,3}^{(1)} \oplus y_{3,2,3}^{(1)}, 1, 0, 0, 0) \in GF(2^8) \backslash \{0\}$.

Figure 5:
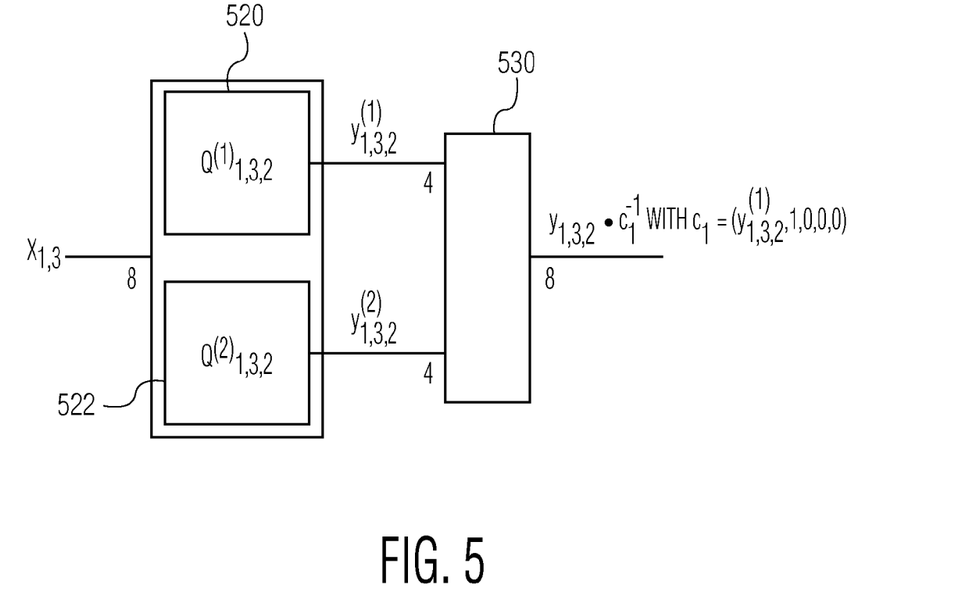
FIG. 5 shows how $c_i^{-1} \cdot y_{j,3,2}$ may be computed for i=j≠4.

This leads to the α's being dependent upon the input state and hence the α's will vary as the input state varies. In the network of FIG. 3, we insert after the Q-boxes a computation of the values $c_1^{-1} \cdot y_{j,3,2}$, $c_2^{-1} \cdot y_{j,3,2}$, $c_3^{-1} \cdot y_{j,3,2}$, $c_4^{-1} \cdot y_{j,3,2}$. FIG. 5 shows how $c_i^{-1} \cdot y_{j,3,2}$ may be computed for i=j≠4 The input $x_{1,3}$ is input to the look-up tables 520 and 522. The look-up tables 520 and 522 operate on nibbles (i.e., upper and lower 4 bits of the byte) to produce nibbles of the output $y_{j,3,2}$. The nibbles of $y_{1,3,2}$ are input to a table 530 that calculates $c_1^{-1} \cdot y_{1,3,2}$ by combining the nibbles and multiplying by $c_1$ where $c_1 = (y_{1,3,2}^{(1)}, 1, 0, 0, 0)$.

Figure 6:
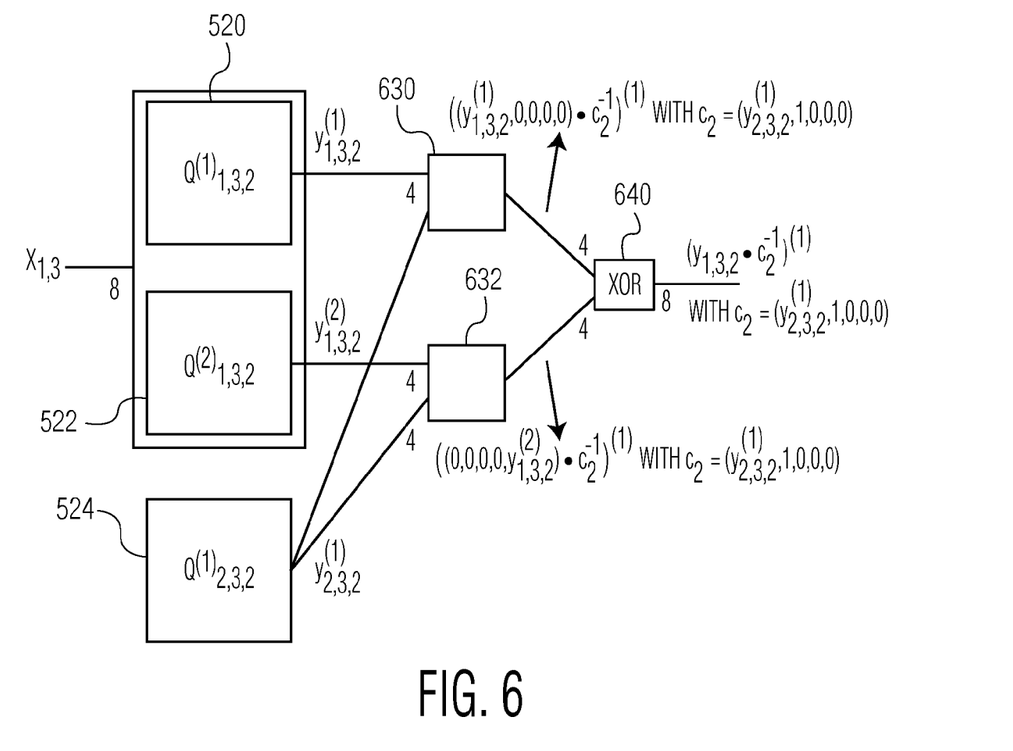
FIG. 6 shows how $c_i^{-1} \cdot y_{j,3,2}$ may be computed for i≠j and i≠4.

FIG. 6 shows how $c_i^{-1} \cdot y_{j,3,2}$ may be computed for i≠j and i≠4. In FIG. 6, i=2 and j=1. As in FIG. 5 the input $x_{1,3}$ is input to the look-up tables 520 and 522. Further, the input x2,3 is input to the look-up tables 524 because $c_2 = (y_{2,3,2}^{(1)}, 1, 0, 0, 0)$. The nibbles of $y_{1,3,2}$ are input to tables 630, 632 and then the XOR 640 to calculate the first nibble of $c_2^{-1} \cdot y_{1,3,2}$. The computation of the second nibble runs similarly.

Figure 7:
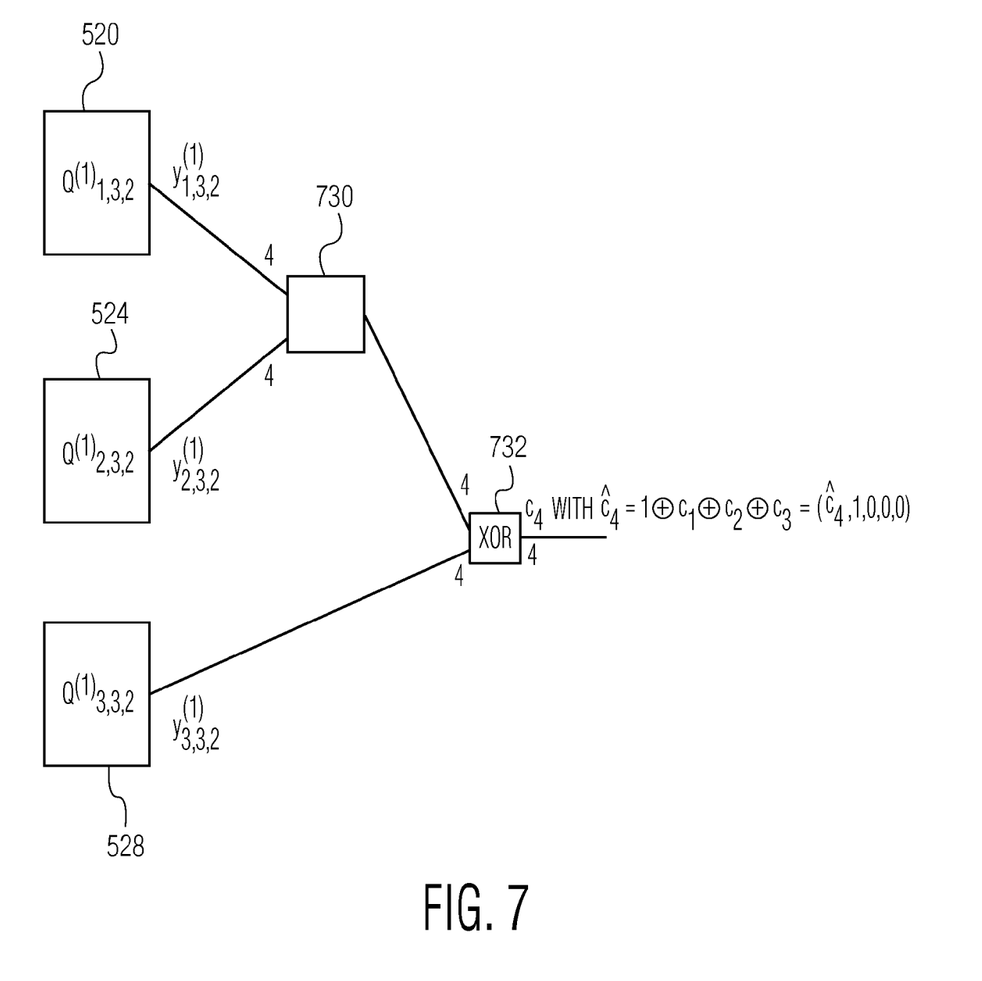
FIG. 7 illustrates a XOR network used to calculate $c_4$.

What remains is the case where i=4, where the value $c_4$ is computed. FIG. 7 illustrates a XOR network used to calculate $c_4$. The inputs $x_{1,3}$, $x_{2,3}$, $x_{3,3}$ input to the look-up tables 520, 524, 528 respectively to produce $y_{1,3,2}^{(1)}$, $y_{2,3,2}^{(1)}$, $y_{3,3,2}^{(1)}$, which are then fed into the XORs 730, 732 as shown to calculate $\hat{c}_4$ which has a one-to-one correspondence to $c_4$ via $c_4 = (\hat{c}_4, 1, 0, 0, 0)$. This value of $\hat{c}_4$ is then used to calculate $c_4^{-1} \cdot y_{1,3,2}$ in a similar way as we calculated $c_2^{-1} \cdot y_{1,3,2}$ in FIG. 6.

The value $c_1^{-1} \cdot z_{2,3}$ may be calculated from $c_1^{-1} \cdot y_{1,3,2}$, $c_1^{-1} \cdot y_{2,3,2}$, $c_1^{-1} \cdot y_{3,3,2}$, $c_1^{-1} \cdot y_{4,3,2}$ in the same way as $z_{2,3}$ is calculated from the output of the Q-boxes as shown in FIG. 3 by simply XORing the four bytes via the XOR network. Similarly, the output bytes $c_2^{-1} \cdot z_{2,3}$, $c_3^{-1} \cdot z_{2,3}$, $c_4^{-1} \cdot z_{2,3}$ may be computed. Further, four split versions of all of the output bytes $z_{i,j} c_n^{-1} \cdot z_{i,j}$ may likewise be produced. These split output bytes become the split inputs into the second round. Further, the lookup tables and network may be further obfuscated as shown in FIG. 4.

In the above discussion, the key-addition operation of the second round was ignored. This simplified the description, for in that case, the output of the round corresponds with the input of the S-box. Any function f preceding and merged with the S-box operation may be accounted for as follows. According to the embodiments of the invention, the S-box should have as input, for example, $\alpha_{2,3}(x)$. Because the S-box is preceded with the function f, the input becomes $x = f(z_{2,3})$. To guarantee that $\alpha_{2,3,k} \circ f(z_{2,3})$ is input to the S-box, $f^{-1} \circ \alpha_{2,3,k} \circ f(z_{2,3})$ is computed instead of $\alpha_{2,3,k}(z_{2,3})$ in round 1 (or in the previous round), where in this case the function f carries out the key addition function.

Next, how to compensate for the split S-box in the second round (and subsequent rounds) is described. In the second round, again groups of four bytes output by the Q-box have to be XORed. Furthermore, because the input is split, the original S-box output is obtained by XORing the result of the n S-box copies. Hence, the second round only differs from the first round in that the number of input bytes is increased by a factor n, i.e., 16n input bytes are received. This means that, to compute a single output byte for the second round, four Q-box output-bytes are not added, but rather 4n Q-box output bytes. Here these 4n output bytes can be divided into four n-tuples, where each n-tuple represents the outcome of an original S-box via the relationship $h(y)=\oplus_i \beta_i(y)$. As described above, the n values $\beta_1(y), \beta_2(y), \ldots, \beta_n(y)$ sum up to $h(y)$ are generally not XORed explicitly for the following reason.

Suppose that the n values $\beta_1(y), \beta_2(y), \ldots, \beta_n(y)$ are XORed explicitly via for instance lookup tables. Instead of mounting the attack on the input of an S-box, an attacker can then mount the attack on this value $h(y)$, which can have a fixed bijective relation to the input of the S-box. This is no longer possible if we XOR the 4n values in a different order and/or apply the splitting functions $\alpha_i$ for the next round while XORing these values, in which case the XORing of $\beta_1(y), \beta_2(y), \ldots, \beta_n(y)$ is no longer done explicitly.

It is also noted that $\beta_j(y)$ is generally not calculated explicitly because the S-box is typically merged with other functions. This also holds in this embodiment where the S-box is merged with the MixColumns operation succeeding it. Hence, instead of $\beta_j(y)$ the value $MC \cdot \beta_j(y)$ is computed for a MixColumns coefficient MC.

A feature of the embodiments described is that the choice of $\Gamma \in W$ depends on a computation based upon the input and that it is not fixed. In the embodiment described above n=4 and the choice of $\Gamma \in W$ depends upon only one of the input bytes. It is possible to use a computation using more input bytes in order to further strengthen the resistance to the Billet attack. This will be described further below where n=2 and the choice of $\Gamma \in W$ depends upon four of the input bytes.

A second exemplary embodiment of the invention to implement the computation of output byte $z_{2,3}$ of first round of AES is now described. The computation of other bytes runs similarly. In the first round the n=2-tuple of bytes $\alpha_{2,3,1}(z_{2,3})$, $\alpha_{2,3,2}(z_{2,3})$ is computed, where the affine functions $\alpha_{2,3,k}$ are taken from W and are not fixed. Being an element from W, means that $\alpha_{2,3,k}: x \mapsto c_k^{-1} \cdot x$ for some $c_k \in GF(2^8) \setminus \{0\}$ with $c_2 = 1 \oplus c_1$.

There are four input bytes to the first round contributing to the value of $z_{2,3}$. A first a Q-box operation is performed on these four input bytes as previously described. Let $y_{i,3,2}$ be the ith output byte of these four Q-box operations. We now let $c_1$ be the product of the first four nibbles of $y_{i,3,2}$ in $GF(2^8)$ unless it is equals to 1. In that case it is set to 2. That is, $$c_1 = \begin{cases} \prod_{i=1}^{4} (y_{i,3,2}^{(1)}, 1, 0, 0, 0) & \text{if value} \neq 1 \\ 2 & \text{otherwise} \end{cases}$$

We note that $(y_{i,3,2}^{(1)}, 1, 0, 0, 0)$ indicates the byte obtained by adding a 1 and 3 zeros to nibble $y_{i,3,2}^{(1)}$. Furthermore, $C_2 = 1 \oplus c_1$. Note that $c_1$ and $c_2$ are both not equal to 0, which is a necessary condition. The values of $c_1, 1 c_2$ are then used in the same manner as described above. This embodiment may be expanded to other values of n. Further, other calculations to determine the values of $c_i$ may be used as well in order to make the splitting of the n values of $x_i$ vary depending upon the input. Such calculations are incorporated into the various functions implemented by the lookup tables in a way so as to obscure the function being performed.

In another embodiment of the invention, the S-boxes or non-linear mapping function of the cryptographic function may be split in addition to splitting the inputs. For example in AES, each of the inputs $\alpha_1(x), \alpha_2(x), \ldots, \alpha_n(x)$ may be input into m split S-boxes. The sum of the split S-boxes would be the original AES S-box. The outputs of the split S-boxes would then be combined in a similar manner for the embodiments described above for just split inputs. Further, description of the use of split S-boxes may be found in copending U.S. patent application No. TBD, Entitled "SPLITTING S-BOXES IN A WHITE-BOX IMPLEMENTATION TO RESIST ATTACKS," which is hereby incorporated by reference for all purposes as if fully set forth herein. Further, any non-linear mapping function used by the cryptographic function may be implemented in a single function or a group of functions that may be combined to produce the same ultimate output as the non-linear function.

A method according to the embodiments of the invention may be implemented on a computer as a computer implemented method, or in dedicated hardware, or in a combination of both. Executable code for a method according to the invention may be stored on a computer program medium. Examples of computer program media include memory devices, optical storage devices, integrated circuits, servers, online software, etc.

In an embodiment of the invention, the computer program may include computer program code adapted to perform all the steps of a method according to the invention when the computer program is run on a computer. Preferably, the computer program is embodied on a non-transitory computer readable medium.

Further, because white-box cryptography is often very complicated and/or obfuscated it is tedious for a human to write. It is therefore of advantage to have a method to create the cryptographic system according to the embodiments of the invention in an automated manner.

A method of creating the cryptographic system according to the invention may be implemented on a computer as a computer implemented method, or in dedicated hardware, or in a combination of both. Executable code for a method according to the invention may be stored on a computer program medium. In such a method, the computer program may include computer program code adapted to perform all the steps of the method when the computer program is run on a computer. The computer program is embodied on a non-transitory computer readable medium.

Any combination of specific software running on a processor to implement the embodiments of the invention, constitute a specific dedicated machine.

A hardware system implementation of the embodiments of the invention may include hardware elements implementing the basic blocks of the white-box implementation. These hardware elements may include, for example, lookup tables or finite state machines. These hardware elements may be interconnected to fully carry out the white-box implementation.

As used herein, the term "non-transitory machine-readable storage medium" will be understood to exclude a transitory propagation signal but to include all forms of volatile and non-volatile memory.

As used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of performing a keyed cryptographic operation by a white-box implementation of a cryptographic system providing cryptography functions on a processor running the white-box implementation, the cryptographic system mapping an input message to an output message, wherein the cryptographic operation includes at least one round including a non-linear mapping function configured to map input data to output data, comprising:

securing information by splitting, by the cryptographic system, the input data into n split input data using n different self-equivalent functions of the non-linear mapping function, wherein the splitting of the input data varies based upon the value of the input message and wherein n is an function further includes inputting $f^{-1} \circ \alpha_i \circ f(x)$ wherein the function f carries out a key addition function on input data x and $\alpha_i$ is the $i^{th}$ split input data;

inputting each split input data into the non-linear mapping function to obtain n split output data; and combing the n split output data to produce an output data, wherein the output data results when the input data is input to the non-linear mapping function.

2. The method of claim 1, wherein inputting each split input data into the non-linear mapping function includes inputting each split input data into a plurality of split mapping functions wherein XORing the plurality of split mapping functions results in the non-linear mapping function.

3. The method of claim 1, wherein the steps of splitting and inputting are associated with a current round of the keyed cryptographic operation producing an output of the current round that is the input to a next round of the keyed cryptographic operation and wherein the keyed cryptographic operation repeats the steps of splitting and inputting on the input to the next round of the keyed cryptographic operation, wherein the input data is split into m input data and m is an integer greater than 1.

4. The method of claim 3, wherein in the next round the value of m is greater than the value of n in the current round and wherein the next round is the second to last round of the keyed cryptographic operation.

5. The method of claim 3, wherein in the current round the value of n is greater than the value of m in the next round and wherein the current round is the second round of the keyed cryptographic operation.

6. The method of claim 1, wherein the splitting of the input data in to n split input data is part of a previous round where the outputs of the previous round become the input to a current round.

7. The method of claim 1, wherein the splitting of the input data depends on a plurality of different portions of the input data.

8. The method of claim 1, wherein lookup tables implement the keyed cryptographic operation.

9. The method of claim 1, wherein finite state machines implement keyed cryptographic operation.

* * * * *